Nov. 11, 1924.  
J. H. WITTMANN  
CHAIR  
Filed April 14, 1922   2 Sheets-Sheet 2

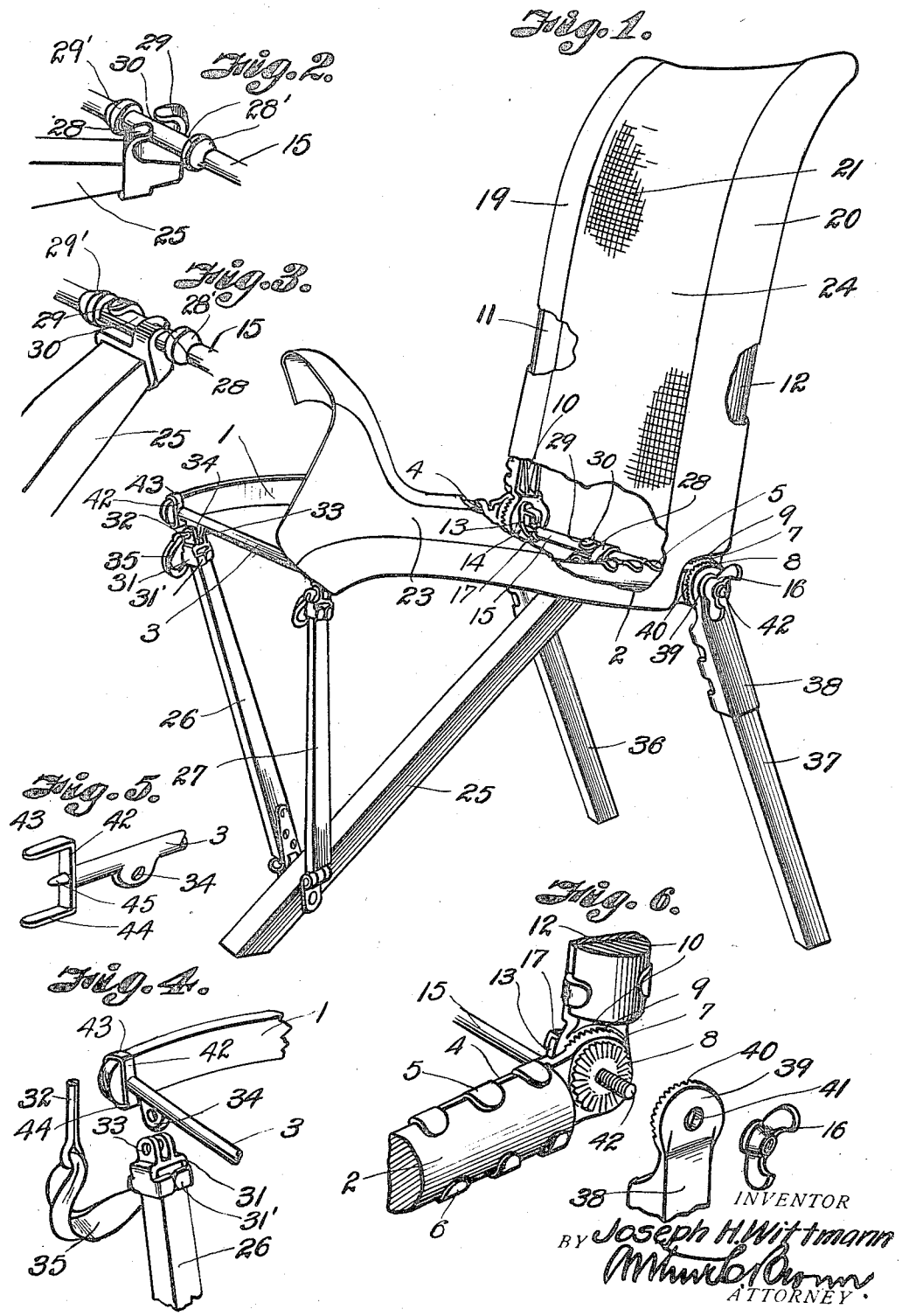

1,514,811

INVENTOR  
Joseph H. Wittmann  
BY  
Arthur C. Brown  
ATTORNEY

Patented Nov. 11, 1924.

1,514,811

UNITED STATES PATENT OFFICE.

JOSEPH H. WITTMANN, OF KANSAS CITY, MISSOURI.

CHAIR.

Application filed April 14, 1922. Serial No. 552,670.

*To all whom it may concern:*

Be it known that I, JOSEPH H. WITTMANN, a citizen of the United States, residing at Kansas City, in the county of Jackson and State of Missouri, have invented certain new and useful Improvements in Chairs; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a combined automobile seat and camp chair.

The primary object of the invention is to provide a supplemental driver's seat which may be placed upon the ordinary seat of the motor vehicle for driving purposes and when in that position, will be so arranged that the back of the driver will be thoroughly ventilated due to air spaces or interstices in the fabric of the back of the seat.

It is also the purpose of the invention to provide removable legs for the seat which may be readily attached thereto without the necessity of employing tools so that the seat can be supported upon legs, rendering it available as a camp chair adapted to be readily re-converted to a supplemental driver's seat when desired.

The invention consists in certain novel parts and combinations of parts, all of which will be specifically referred to hereinafter, reference being had to the accompanying drawings, in which—

Fig. 1 is a perspective view of the device set up as a camp chair, part of the back and seat fabric being removed to better illustrate the frame and leg connections.

Fig. 2 is a detail perspective view of one end of the front leg, showing the means for clamping the front leg to the rear transverse bar of the seat, the clamping means being shown as ready to be applied.

Fig. 3 is a perspective view of the same and of the leg, showing it applied to the transverse bar.

Fig. 4 is a disassociated, fragmentary view of one front corner of the seat frame, showing the means of attaching one of the front leg brace members to the front of the seat.

Fig. 5 is a perspective view of one end of the front transverse tie rod.

Fig. 6 is a fragmentary, perspective view showing the manner of attaching one of the rear leg members to the rear of the seat.

Figure 7:
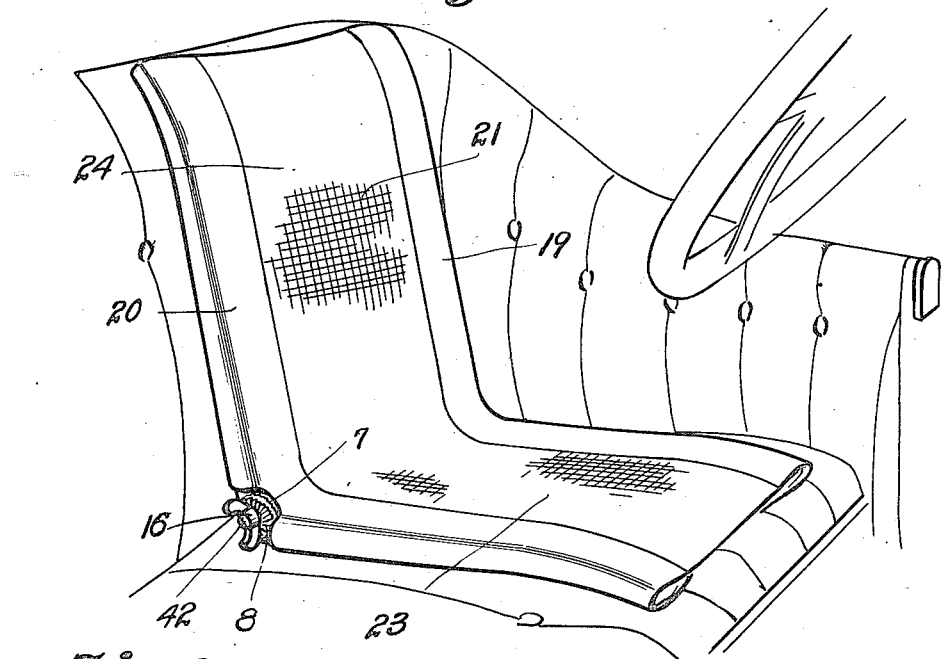
Fig. 7 is a fragmentary, perspective view of the front seat of a motor vehicle to which the device is applied as a supplemental seat.
Figure 9:
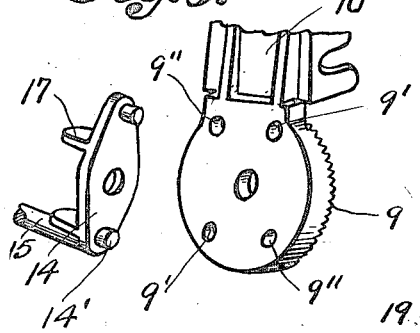
Fig. 9 is a fragmentary perspective view of one end of the rear transverse tie rod and one of the rear corner hinge members.
Figure 8:
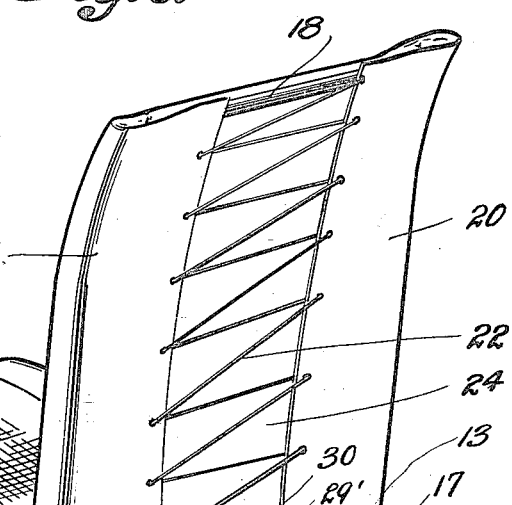
Fig. 8 is a rear perspective view of the seat minus the legs for supporting it.

The seat frame is shown as consisting of two side bars 1 and 2, connected at their forward ends by a transverse tie rod 3. The rear ends of the bars 1 and 2 are each provided with a hinge plate 4, fastened thereto by the clamping fingers 5 and 6 on opposite edges of the plate 4. The plate is shown as having two ratchet faces designated 7 and 8. The ratchet face 7 is engaged by a ratchet face 9 on a hinge plate 10 fastened to the side bars of the back member. The back member has two side bars 11 and 12, each of which is provided with a plate 10, the ratchet face 9 of which co-operates with a complementary ratchet face 7 on one of the side bars 1 and 2.

The hinge plates are secured in co-operative position by square headed bolts 13, passing through the central openings in the plates 4 and 10. The plates 10 have two sets of holes 9' and 9'' to receive the pins 14' on the end plate 14 of the rear brace member 15. The headed bolt passes through a central opening in the plate 14 so that the plate 14 and the plates 4 and 10 may be all fastened together and held in place by a wing nut 16, the bolt being prevented from turning by bending over the flexible fingers 17 on the inside of each plate 14 so that the fingers 17 act as locking fingers to prevent the square headed bolt 13 from turning.

The hinge plates 4 and 10 can be held rigid when the wing nut 16 is screwed in tightly on the threaded end of the bolt 13 to lock the ratchet faces 7 and 9 together, thereby holding the back side bars 11 and 12 in any adjusted position with respect to the side bars 1 and 2; it being understood that the side bars 11 and 12 may swing in an arc with respect to the seat so as to vary the angle of the back with respect to the seat frame, the upper ends of the bars 11 and 12 being connected by a cross bar 18.

The entire seat frame consisting of the side bars 1 and 2 and 11 and 12 may be provided with a slip cover consisting of two side strips 19 and 20 connected by an intermediate strip 21 of mesh, the side strips extending around the edges of the side bars 1, 2, 11 and 12 and being laced by a lacing 22. The mesh intermediate insert or strip 21 will allow the passage of air through the back and through the seat to insure ventilation. The portion 23 of the slip cover constitutes a seat bottom and the portion 24 constitutes a ventilating chair back.

When the device is used as an auxiliary automobile seat, it will assume the position shown in Figs. 6 and 7 and it is obvious that the back may be adjusted with respect to the seat portion in a convenient and novel manner by loosening the wing nuts until the desired adjustment is made and then tightening them to maintain the adjustment, the parts being fastened against relative movement when the nuts are screwed home because the ratchets 7 and 9 will intermesh.

If it is desired to utilize the supplemental seat as a camp chair, I may utilize certain detachable legs, conveniently fastened to the front rod 3 and the rear rod 15. The front support consists of a tripod comprising a leg member 25 and two brace bars 26 and 27. The member 25 has at one end a socket with overlapping, oppositely directed fingers 28 and 29, separated by a space 30 large enough for the rod 15 to pass between when the member 25 is turned, as shown in Fig. 2.

When the member 25 is turned, as shown in Fig. 3, to permit the fingers 28 and 29 to bear upon the rod 15, the upper end of the member 25 will be attached thereto and serve as a support for the rear of the seat. In order to prevent the fingers from slipping longitudinally of the rear brace bar 15, I have provided rigid collars 28' and 29' on said rod, between which the fingers 28 and 29 are positioned so that they will be confined between the collars. This is clearly shown in Figs. 1, 2 and 3. The front of the seat will be supported upon the upper ends of the brace members 26 and 27.

Each brace member has a cap piece 31 with fingers 31' which can be bent into their braces 26 or 29, as the case may be to fasten the member 31 to the brace.

The brace members carry pins 32, which are adapted to pass through the perforations in aligning, upstanding ears 33, between which may be received the ears 34 on the front rod 3, the ears 33 as well as the ears 34 having openings through which the pins 32 may project so that the brace rods will be fastened to the front brace 3 in an efficient manner. In order that the pins may be properly carried by the brace rods 26 and 27 I provide a flexible connection 35, as clearly seen in Fig. 4.

By reference to Fig. 1 it will be seen that the two members 26 and 27 can be quickly and easily fastened to the rod 3 and when the leg member 25 is fastened to 15, the tripod will be efficiently secured to the chair seat.

The chair seat is provided with two rear leg members 36 and 37, each of which has a plate 38 fastened thereto with a ratchet faced portion 39, the ratchet teeth 40 of which are adapted to bear against the faces 8 of the members 4, and each member 39 is provided with an opening 41, through which a threaded end 42 of the bolt 13 may project, it being understood that in order to apply the rear legs 36 and 37, the wing nuts 16 must be removed. After the rear leg members 36 and 37 are assembled, the wing nuts will serve as clamping nuts to firmly bind the members 14, 10, 4 and 38 together.

Since the ratchet faces 40 combine with the ratchet faces 8, it will be apparent that the rear legs 36 and 37 can be adjusted to cause the seat bottom 23 to be in a horizontal position, or the chair may be tilted so that the rear portion of the seat inclines downwardly and it will also be apparent that the back can be adjusted to suit the inclination of the occupant.

The arrangement of the tripod for the front of the chair and braced by the main leg member 25 secured to the rear of the chair and the two rear legs 36 and 37 will provide a stable form of chair which may be readily transported and which may be easily knocked down whenever desired. The legs can be readily taken off by removing the pins 32, and turning the leg member 25 to reverse the position shown in Figs. 2 and 3 so that the leg member 25 can be detached from the rod 15. The legs 36 and 37 may be conveniently taken off by removing the wing nuts 16, which will be reapplied to the threaded ends 42 of the bolts 13 when the legs have become detached, and then the device will be ready to be applied as a supplemental seat for motor vehicles.

When the device is used as a seat for motor vehicle drivers, the back may be readily tilted at any inclination by loosening the wing nuts 16. If the back is swung rearwardly, it will throw the seat forward to accommodate persons with short legs and after the proper adjustment has been made, permanency may be secured by tightening the nuts 16.

If the legs of the driver are long, the back may be straightened up to throw the supplemental seat further back on the motor vehicle seat to provide ample room. It will, therefore, be seen that the adjustment may be variable to suit persons of different statures.

Suitable means has been provided for fastening the front brace rod 3 to the side braces 1 and 2 and as illustrated, a clip integral with and at each end of the rod 3 may be provided for fastening the rod to the side braces.

By reference to Figs. 4 and 5 it will be observed that the clip for the ends of the rod 3 consists of a transverse bar 42, having flexible fingers 43 and 44 and between them is a pin or tine 45, which can be forced into openings in the side bars 1 and 2 so as to properly locate the ends of the front tie rod 3 with respect to the side bars 1 and 2 and then the fingers 43 and 44 are bent over the outsides of the bars 1 and 2 to hold the front brace bar 3 in fixed relation with the side bars 1 and 2 so that the member 3 cannot become displaced.

Attention is called to the fact that there are two sets of openings 9' and 9'' in the plate or portion 9 of the member 10. These openings are arranged in this way because by so doing, the necessity for rights and lefts as applied to the members 10 can be eliminated. If a single set of openings 9' or 9'' were provided, two separate sets of castings would have to be provided because the angle would be different on one corner than at the other, but by arranging the openings 9' and 9'', as shown, there will always be a set of openings in position to receive the projections or studs 14' on the plates 14 at each end of the rear transverse tie rod 15.

I prefer to arrange the plates 14 so that they will be at an angle to best resist the strains and thrusts of the parts which are connected. When the plates 14 are arranged at an angle so that they will be substantially diagonal, they will not be subjected to so much leverage when pressure is applied to the back and to the seat as would be the case if the plates were substantially vertical when they were assembled as part of the chair structure.

Figure 10:
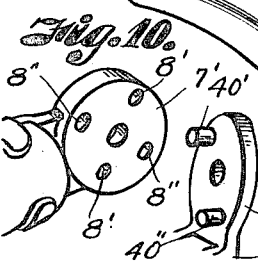
Fig. 10 is a disassociated perspective view of a modified form of hinge plates for connecting the side bars of the seat to the rear legs.

Instead of the ratchet plates 7 for securing the side bars to the rear leg socket members 38, I may provide a modified form of plate 7', having a central opening for the bolt 42 and diagonally disposed pairs of openings 8' and 8'' to receive the lugs 40' and 40'' on the plate 39'. The socket 38' corresponds to the socket 38. Therefore, it will be seen that the construction shown in Fig. 10 can be used instead of the ratchets 8 and 40 but there can be only a fixed adjustment because the pins 40' and 40'' will fit in two complementary holes 8' or 8'', depending upon which side the leg happens to be, it being understood, of course, that only two of the diagonally disposed holes will be used for the pins. The purpose of making the double sets of holes in the member 7' is to permit a single casting for both sides so that there will be no rights and lefts.

It is an important feature of my invention that the three legged chair particularly adapt itself for outdoor use, because a three legged chair, such as shown in the drawings, particularly lends itself for uneven ground much better than a four legged chair.

While I have described the invention as particularly applicable for use in connection with motor vehicles and as a camp chair, it is obvious that the device is not necessarily limited to such uses as there are certain features of the invention which render it applicable for other uses. For example, the novelty residing in the arrangement of the legs and the collapsible feature of the chair may be taken advantage of wherever expedient, without necessarily involving either a motor vehicle seat or a camp chair, so I, therefore, reserve the right to apply any of the novel features of my invention wherever applicable.

What I claim and desire to secure by Letters-Patent is:

1. A chair comprising a seat, a tripod structure connected to the front and rear ends of the seat, one member of the tripod being fastened to the rear of the seat midway between the sides of the seat, the other two members of the tripod being fastened to the lower portion of the first member and to the front corners of the seat, and legs adjustably connected to the rear corners of the seat.

2. A chair comprising a seat, a removable front leg secured to the rear of the seat midway between the sides thereof and having braces removably engaging the front corners of the seat, and removable rear legs for the seat.

In testimony whereof I affix my signature.

JOSEPH H. WITTMANN.